United States Patent [19]

Etzbach et al.

[11] Patent Number: 5,483,005

[45] Date of Patent: * Jan. 9, 1996

[54] PREPARATION OF POLYMERS WITH NLO-ACTIVE SIDE GROUPS AND THE USE THEREOF

[75] Inventors: Karl-Heinz Etzbach, Frankenthal; Stefan Beckmann, Mannheim, both of Germany

[73] Assignee: BASF Aktiengesellschaft, Ludwigshafen, Germany

[ * ] Notice: The portion of the term of this patent subsequent to Jan. 24, 2012, has been disclaimed.

[21] Appl. No.: 145,601

[22] Filed: Nov. 4, 1993

[30] Foreign Application Priority Data

Nov. 7, 1992 [DE] Germany .......................... 42 37 639.4

[51] Int. Cl.[6] .................................................. C08F 26/02
[52] U.S. Cl. ...................... 525/328.2; 525/293; 525/295; 525/374; 525/376; 525/377; 525/380; 525/286; 526/298; 526/301; 526/302
[58] Field of Search ................................. 525/293, 295, 525/374, 376, 377, 380, 328.2; 526/298, 301, 302

[56] References Cited

U.S. PATENT DOCUMENTS

| 4,894,263 | 1/1990 | Dubois et al. | 428/1 |
|---|---|---|---|
| 4,935,292 | 6/1990 | Marks et al. | 428/220 |
| 4,952,640 | 8/1990 | Francis et al. | 525/328.2 |
| 5,227,444 | 7/1993 | Muller et al. | 526/311 |
| 5,231,140 | 7/1993 | Kilburg et al. | 525/274 |

FOREIGN PATENT DOCUMENTS

| 334176 | 9/1989 | European Pat. Off. . |
|---|---|---|
| 337405 | 10/1989 | European Pat. Off. . |
| 396172 | 11/1990 | European Pat. Off. . |
| 478268 | 4/1992 | European Pat. Off. . |
| 2630744 | 11/1989 | France . |

OTHER PUBLICATIONS

Chem Abstr. 119:117921t ("Sep. 20, 1993").
Linear Polymers for Nonlinear Optics Polyacrylates . . . Robello J. Polym. Sci.; Part A 28 (1990).

*Primary Examiner*—Mark Nagumo
*Attorney, Agent, or Firm*—Keil & Weinkauf

[57] ABSTRACT

A process for preparing (meth)acrylate polymers with lateral non-linear optical chromophores and molecular weights of from 5000 to 500,000, comprises reacting polymers of (meth)acryloyl isocyanate in solution with D-ω-hydroxyalkyl chromophores of the formula (I)

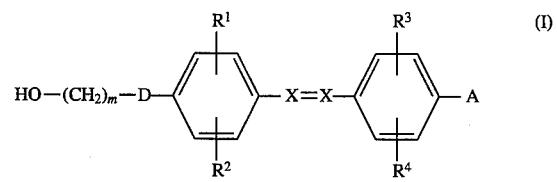

where
D is an electron donor,
A is an electron acceptor,
$R^1$, $R^2$, $R^3$ and $R^4$ can be identical or different and are each H, alkyl, cycloalkyl, alkoxy or $R^3$ and $R^4$ are each CN, $NO_2$ or CHO or $R^1$ and $R^2$, or $R^3$ and $R^4$, together form a fused-on ring,
X is CH and/or N
and
m is an integer from 2 to 11.

The products are suitable for optical components in communications technology.

8 Claims, No Drawings

PREPARATION OF POLYMERS WITH NLO-ACTIVE SIDE GROUPS AND THE USE THEREOF

The present invention relates to a process for preparing (meth)acrylate polymers with lateral non-linear optical chromophores and molecular weights of from 5000 to 500,000, to the polymers obtained by this process, and to the use thereof in optical components, especially in communications technology.

Polymers with lateral non-linear optical chromophores and the preparation thereof by free-radical polymerisation of ethylenically unsaturated organic compounds (methacrylic and acrylic compounds) which have non-linear optical (=NLO) chromophores as side groups have been disclosed and are described, for example, by D. R. Robello in J. Polym. Sci.; Part A=Polymer Chemistry 28 (1990) 1, and in EP-A 0337405, EP-A 0334176, EP-A 0396172, FR-A 02630744, FR-A 2597109 and EP-A 0478268.

However, the free-radical polymerization of monomers with NLO side groups results, as a consequence of the retarding action of nitro and azo groups, only in products with relatively low molecular weights of up to about $\overline{M}_n=25,000$. Another disadvantage is that the reproducibility of the preparation of such products is poor. It is true that U.S. Pat. No. 4,935,292 has disclosed functionalized polymers which have non-linear optical properties and are obtained from polystyrene, which is first chloromethylated and then converted into the more reactive iodomethyl derivative which is finally etherified with the thallium salt of an alcohol chromophore, or quaternized by reaction with a pyridinium chromophore. The functionalization of poly(p-hydroxystyrene) is also mentioned herein and entails nucleophilic substitution of the phenolate ion of poly(p-hydroxystyrene) on the tosylate of the chromophore to attach the chromophore by an ether linkage to the poly(p-hydroxystyrene). The methods described in U.S. Pat. No. 4,935,292 for preparing polymers with non-linear optical properties are rather elaborate and, because of the toxicity of thallium, require extensive safety measures. In addition, in this case there are limitations on the molecular weights which can be reached for the polymers as well as on the nature of the polymers. Besides the polymethacrylates mentioned, it is also possible to obtain the polyacrylates by reactions on the polymers. However, the U.S. patent provides no information about the molecular weight distribution and the reproducibility of the polymers described therein.

The reactions on polymers described in the earlier DE-A 41 16 594 liberate by-products such as HCl which may have adverse effects on the polymer matrix, especially in terms of optical applications.

It is an object of the present invention to indicate a process for preparing (meth)acrylate polymers with lateral non-linear optical chromophores which does not have, or has to a considerably reduced extent, the abovementioned disadvantages of the prior art and which is particularly distinguished by the intrinsic simplicity of the process, the freedom of by-products in the reaction on the polymers, the good reproducibility, a high molecular weight and a narrow molecular weight distribution of the materials obtained thereby.

We have found that this object can be achieved very advantageously by reaction of (meth)acryloyl isocyanate polymers with D-ω-hydroxyalkyl chromophores.

The present invention relates to a process for preparing (meth)acrylate polymers with lateral non-linear optical chromophores and molecular weights $\overline{M}_w$ of from 5000 to 500,000, which comprises reacting polymers of (meth)acryloyl isocyanate in solution with D-ω-hydroxyalkyl chromophores of the formula (I)

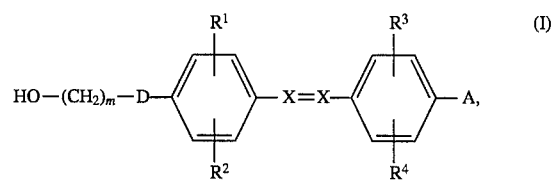

where
D is an electron donor,
A is an electron acceptor,
$R^1$, $R^2$, $R^3$ and $R^4$ can be identical or different and are each H, alkyl of 1 to 6 carbons, cycloalkyl of 5 or 6 carbons, alkoxy of 1 to 4 carbons or $R^3$ and $R^4$ are each CN, $NO_2$ or CHO or $R^1$ and $R^2$, or $R^3$ and $R^4$, together form a fused-on ring,
X is CH and/or N
and
m is an integer from 2 to 11, preferably 2 to 8.

Preferred embodiments of the process according to the invention comprise reacting non-linear optical D-ω-hydroxyalkyl chromophores of the formula (I) with copolymers of (meth)acryloyl isocyanate and methacrylic esters or with copolymers of (meth)acryloyl isocyanate and acrylic esters, for example with copolymers of (meth)acryloyl isocyanate and adamantyl acrylate or adamantyl methacrylate.

Further embodiments of the process according to the invention comprise reaction of the alcohols of the formula (I) with the polymers of (meth)acryloyl isocyanate being carried out so that isocyanate functionalities are still present in the polymer after the reaction and can subsequently been converted into urethane moieties or further functionalized, or the isocyanate groups still present in the polymer after the reaction being reacted with crosslinkable alcohols or crosslinkable amines.

The crosslinkable alcohols or crosslinkable amines which can be employed are, in particular, those which contain the following groups bonded to the oxygen or nitrogen respectively:

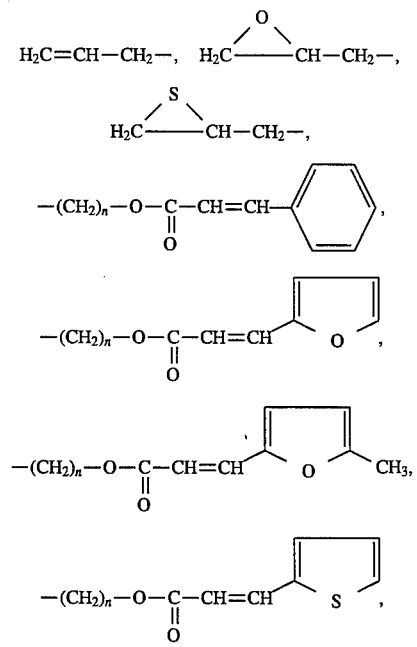

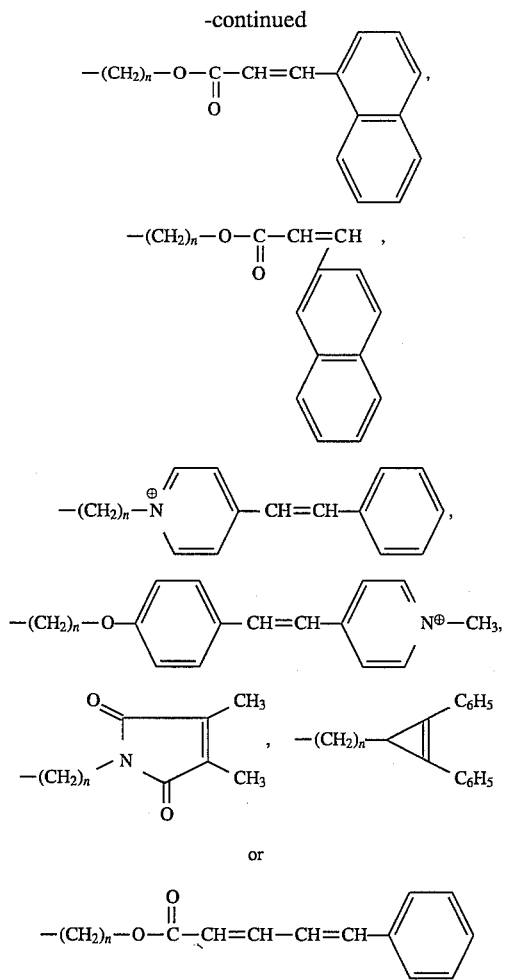

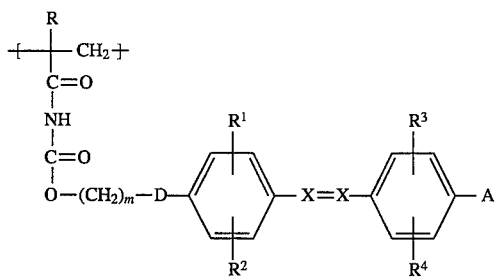

with n=1 to 10.

The present invention also relates to polymers which have a content of or are composed of repeating units of the formula (II), $$\begin{array}{c} R \\ \mid \\ \text{---}[\text{---}CH_2\text{---}]\text{---} \\ \mid \\ C=O \\ \mid \\ NH \\ \mid \\ C=O \\ \mid \\ O\text{---}(CH_2)_m\text{---}D\text{---}\langle R^1, R^2 \rangle\text{---}X=X\text{---}\langle R^3, R^4 \rangle\text{---}A \end{array} \quad (II)$$

where D, A, X, m, $R^1$, $R^2$, $R^3$ and $R^4$ have the abovementioned meanings, and R is hydrogen or methyl, these polymers having been prepared by one of the processes according to the invention.

Also preferred are polymers which have been prepared in this way and in which D is $NR^5$ or O, —X=X— is —N=N—, —N=CH—, —CH=N— or —CH=CH—, A is H, $NO_2$, CN, CHO,

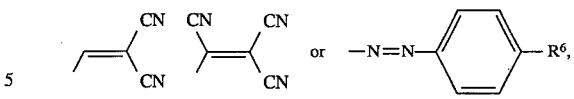

$R^5$ is $C_1$–$C_6$-alkyl or -alkenyl, $C_5$–$C_7$-cycloalkyl, phenyl, benzyl, tolyl or a crosslinkable group and $R^6$ is H, $NO_2$, CN or CHO, and which contain as crosslinkable group $R^5$ a vinyl, methallyl, allyl, acryloyl, methacryloyl, —$(CH_2)_n$—O—CO—CH=$CH_2$, —$(CH_2)_n$—O—CO—C($CH_3$)=$CH_2$ with n=1 to 8, oxiranyl or thiiranyl group.

The polymers prepared according to the invention can be composed only of repeating units of the formula (II) or they can, in addition to the repeating units of the formula (II), also contain other repeating comonomer units.

The present invention also relates to the use of the non-linear optical polymers prepared according to the invention in optical components, and to the use thereof in communications technology.

The process according to the invention is particularly distinguished in that it is possible in this way to prepare polymers free of by-products such as HCl and thus very reproducibly with high molecular weights.

High molecular weights are desirable because they are essential for the production of high-quality films required for non-linear optical applications. In addition, the relaxation of the NLO-active groups after alignment in the electrical field is distinctly reduced in the case of high molecular weight polymers.

Whereas the preparation of polymerizable ethylenically unsaturated monomeric compounds with non-linear optical chromophore groups is very elaborate, especially with regard to their purification, which must take place by column chromatography and subsequent recrystallization with considerable expenditure of time and material (large amount of solvent used), purification of the alcohols containing the chromophore groups is much simpler and they can be obtained in virtually analytical purity by simple recrystallization, for example from toluene or pyridine/ethanol (1:4). Even if these alcohols still contain small amounts of impurities, they can be employed for the reaction on the polymers without disadvantages for the subsequent products, which is a particular advantage for the preparation of the products on the industrial scale.

Details of the process according to the invention follow.

Homo- and copolymers of acryloyl or methacryloyl isocyanate can be prepared quantitatively from the monomers by conventional processes, for example by free-radical polymerization in solution. Suitable solvents are conventional organic solvents which are inert towards isocyanate functionalities, eg. ethers such as dioxane or tetrahydrofuran, dimethylformamide, N-methylpyrrolidone, aromatic hydrocarbons such as benzene or toluene, and chlorobenzene and mixtures thereof.

Suitable comonomers which can be copolymerized in virtually any ratio with (meth)acryloyl isocyanate are esters of acrylic and methacrylic acids with alcohols containing 1–18, preferably 1–8, carbons, eg. methyl methacrylate, ethyl acrylate, n- and i-butyl acrylate, hexyl acrylate and 2-ethylhexyl acrylate, and vinyl-aromatics such as styrene, or other ethylenically unsaturated compounds which can be copolymerized with (meth)acryloyl isocyanate, as well as mixtures of copolymerizable ethylenically unsaturated organic compounds of these types. It is expedient to purify the monomers before the polymerization by methods familiar to the skilled worker, eg. by distillation or recrystallization. The homo- or copolymerization of (meth)acryloyl isocyanate is normally carried out in the presence of catalysts which provide free radicals, eg. azodiisobutyronitrile or peroxides such as dibenzoyl peroxide or dilauroyl peroxide.

The properties and molecular weights of the (meth)acryloyl isocyanate polymers can be influenced and specifically adjusted by appropriate choice of the type and amount of comonomers and the polymerization conditions such as temperature, solvent content or amount of polymerization catalyst in a manner familiar to the skilled worker.

It is particularly advantageous to adjust the molecular weights $M_w$ of these polymers to the range from 10,000 to 200,000.

The (meth)acryloyl isocyanate polymers can advantageously be reacted in situ—without intermediate isolation—in solution with D-ω-hydroxyalkyl chromophores of the formula (I)

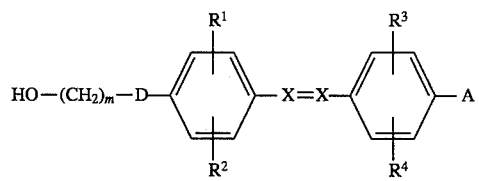

where
D is an electron donor,
A is an electron acceptor,
X is CH and/or N
$R^1$, $R^2$, $R^3$ and $R^4$ can be identical or different and are each H, alkyl of 1 to 6 carbons, cycloalkyl of 5 or 6 carbons, alkoxy of 1 to 4 carbons or $R^3$ and $R^4$ are each CN, $NO_2$ or CHO or $R^1$ and $R^2$, or $R^3$ and $R^4$, together form a fused-on ring,
and m is an integer from 2 to 11, preferably from 2 to 8.

The reaction of the D-ω-hydroxyalkyl chromophores with the (meth)acryloyl isocyanate homopolymer or with the copolymers of (meth)acryloyl isocyanate and methyl methacrylate can take place at, for example, from 10° to 30° C. The polymers can be precipitated, for example, in methanol/HCl and reprecipitated three times from THF/methanol.

The electron donor D in the formula (I) for the D-ω-hydroxyalkyl chromophores can be oxygen or $NR^5$ where $R^5$ is alkyl of 1–6 carbons, for example methyl, ethyl, butyl, hexyl, $C_1$–$C_6$-alkenyl, eg. allyl or hexenyl, cycloalkyl of 5–7 carbons such as cyclohexyl, phenyl, benzyl, tolyl or a crosslinkable group such as vinyl, allyl, methallyl, acryloyl, methacryloyl, $-(CH_2)_n-O-CO-CH=CH_2$, $-(CH_2)_n-O-CO-C(CH_3)=CH_2$ with n=1 to 8, oxiranyl or thiiranyl, for example

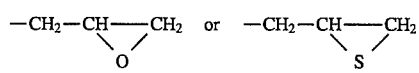

The electron acceptor A in the formula (I) can be hydrogen, $NO_2$, CN, CHO or

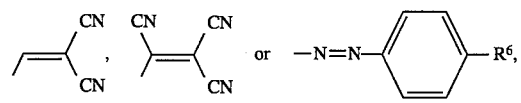

with $R^6$=H, $NO_2$, CN or CHO.

$R^1$, $R^2$, $R^3$ and $R^4$ in the formula (I) and (II) can be hydrogen, alkyl of 1–6 carbons, for example methyl, ethyl, isopropyl, n-butyl, isobutyl,-hexyl, cycloalkyl of 5–6 carbons, such as cyclohexyl, or $R^1$ and $R^2$, or $R^3$ and $R^4$, can together form a fused-on ring, eg. naphthyl.

Examples of D-ω-hydroxyalkyl chromophores of these types are:

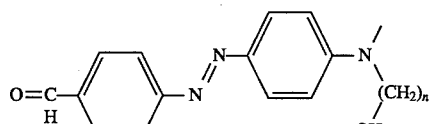

n = 2, 3, 4, 6

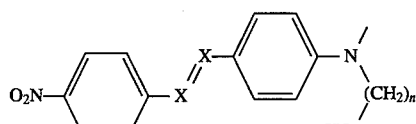

X = N, CH      n = 2, 3, 4, 6

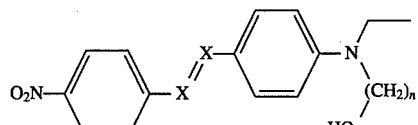

X = N, CH      n = 2, 3, 4, 6

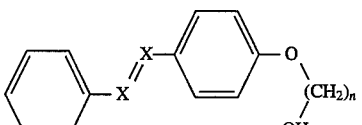

X = N, CH      n = 2, 3, 6, 8, 11

-continued

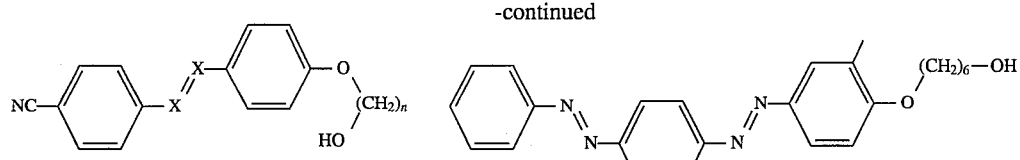
X = N, CH    n = 2, 3, 6, 8, 11

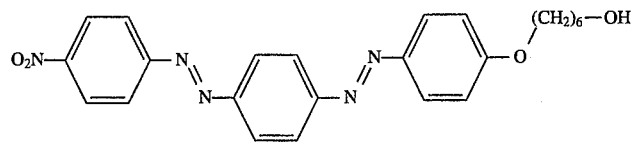

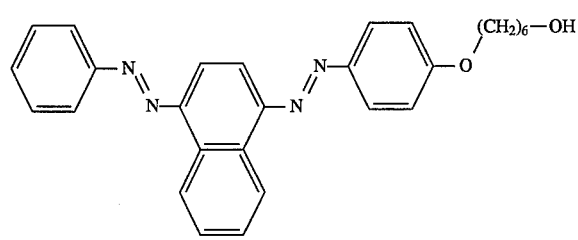

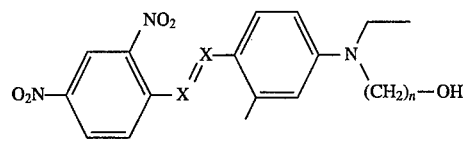
n = 2, 3, 4, 5    X = N, CH    X = N, CH    n = 2, 3, 4, 5

Another advantage of the process according to the invention is the possibility of preventing relaxation of the functional groups, specifically by the crosslinking of the polymer following a polarization. The introduction of crosslinkable groups into a polymethacrylate by reaction on the polymer is very much more simple than the corresponding terpolymerization.

Examples of $R^5$ groups of the abovementioned types which are possible and suitable for the crosslinking are

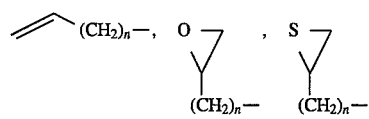

and the abovementioned groups derived from cinnamic acid, styrene, maleimide and cyclopropane.

Examples of prepolymer compositions which can be used for the reaction with the chromophore alcohols are:

| | X | Y |
|---|---|---|
| | 1.0 | 0.0 |
| | 0.5 | 0.5 |
| | 0.4 | 0.6 |
| | 0.3 | 0.7 |
| | 0.2 | 0.8 |
| | 0.1 | 0.9 |

The process according to the invention makes it possible to synthesize exactly defined prepolymers with high molecular weights and a narrow molecular weight distribution, with high glass transition temperatures being obtained.

Other advantages of the process according to the invention are that the reproducibility of the preparation of the polymers is good, the preparation is easier owing to the reduced number of steps in the purification of the ω-hydroxyalkyl chromophores, the reaction is fast, solvents are saved because column chromatography is unnecessary, and further functionalization is easy, ie. introduction of further functional groups.

Unless otherwise indicated, parts and percentages in the examples are by weight.

Preparation of various polymers with lateral non-linear optical chromophores.

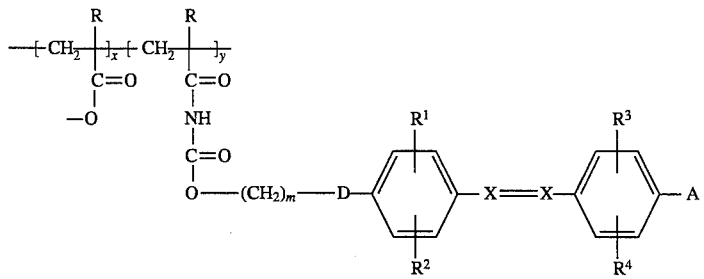

EXAMPLE 1 x=0.5; y=0.5

11.1 g (0.1 mol) of freshly distilled methacryloyl isocyanate, 10.0 g (0.1 mol) of freshly distilled methyl methacrylate, 0.164 g (0.001 mol) of azodiisobutyronitrile (=AIBN) and 100 ml of toluene are introduced into a 300 ml Schlenk tube from which traces of water and atmospheric oxygen have previously been removed. The solution is carefully degassed with dry nitrogen and then polymerized at 60° C. for 48 hours. After cooling to 20° C., a solution of 37 g (0.1 mol) of 4 -(N-hydroxyhexyl-N-methylamino)-4'-nitroazobenzene in 100 ml of dry toluene is added under a countercurrent of nitrogen. This is followed by stirring at 20° C. for 1 hour and subsequent precipitation with methanol. The polymer is purified by three reprecipitations from tetrahydrofuran (THF) in methanol.

Yield=48.3 g (83.4%). Elemental analysis: Calculated: C 61.96 H 6.71 N 12.05 O 19.28 Found: C 60.98 H 6.92 N 11.88 O 20.22 GPC: $\overline{M}_w$=24,000 (GPC=gel permeation chromatography) ($\overline{M}_w$=average molecular weight) $T_G$: 145° C. ($T_G$=glass transition temperature)

EXAMPLE 2 x=0.8; y=0.2

2.22 g (0.02 mol) of freshly distilled methacryloyl isocyanate, 8 g (0.08 mol) of methyl methacrylate, 0.164 g (0.001 mol) of azodiisobutyronitrile and 100 ml of dry toluene are introduced into a 300 ml Schlenk tube from which traces of water and atmospheric oxygen have previously been removed. The solution is carefully degassed with dry nitrogen and then polymerized at 60° C. for 48 hours. After cooling to 20° C., a solution of 7.4 g (0.02 mol) of 4-(N-hydroxyhexyl-N-methylamino)-4'-nitroazobenzene in 70 ml of dry toluene is added under a countercurrent of nitrogen. This is followed by stirring at 20° C. for 1 hour and subsequent precipitation with methanol. The polymer is purified by three reprecipitations from tetrahydrofuran (THF) in methanol.

Yield=15.5 g (88%). Elemental analysis: Calculated: C 63.1H 4.88 N 12.06 O 19.94 Found: C 64.2 H 4.95 N 11.85 O 19.02 GPC: $\overline{M}_w$=30,500 $T_G$: 140° C.

EXAMPLE 3

Thin films of the NLO-active polymers prepared as in Examples 1 and 2 are applied by spincoating 20% strength solutions onto substrates which are provided with a transparent electrode. After coating and drying, another transparent electrode is attached. The sandwich samples produced in this way are polarized at the softening point and are then cooled to room temperature, and the modulation of birefringence is then investigated. Known computational operations are used to determine the attenuation and the electrooptical coefficients. The samples produced in this way have good electrooptical coefficients and thus can be used in novel optical non-linear arrangements.

We claim:

1. A polymer comprising repeating units of the formula (II)

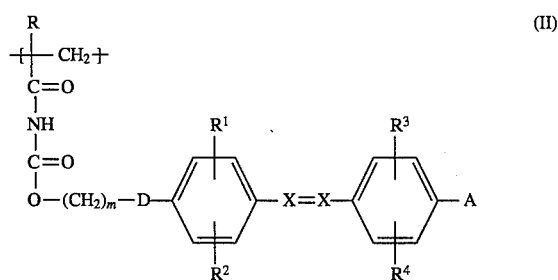

and having a molecular weight of from 5000 to 500,000, where

D is an electron donor,

A is an electron acceptor, $R^1$, $R^2$, $R^3$, and $R^4$ can be identical or different and are each H, alkyl of 1 to 6 carbons, cycloalkyl of 5 or 6 carbons, alkoxy of 1 to 4 carbons or $R^3$ and $R^4$ are each CN, $NO_2$ or CHO or $R^1$ and $R^2$, or $R^3$ and $R^4$, together form a fused-on ring, X is CH and/or N and m is an integer from 2 to 11, which has been prepared by reacting polymers of (meth) acryloyl isocyanate in solution with D-ω-hydroxyalkyl chromophores of the formula (I)

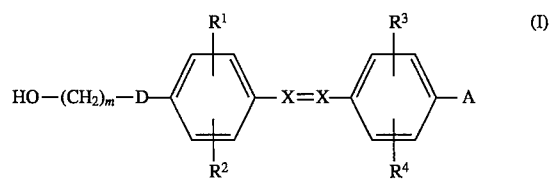

optionally wherein the reaction of the alcohols of the formula (I) with the polymers of (meth)acryloyl isocyanate is carried out so that isocyanate functionalities are still present in the polymer after said reaction.

2. A polymer as claimed in claim 1, wherein D is $NR^5$ or O, —X=X— is —N=N—, —N=CH—, —CH=N— or —CH=CH—, A is H, $NO_2$, CN, CHO,

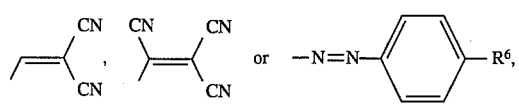

R⁵ is $C_1$–$C_6$-alkyl or -alkenyl, $C_5$–$C_7$-cycloalkyl, phenyl, benzyl, tolyl or a crosslinkable group and R⁶ is H, $NO_2$, CN or CHO.

3. A polymer as claimed in claim 2, wherein the crosslinkable group R⁵ is vinyl, methallyl, allyl, acryloyl, methacryloyl, —$(CH_2)_n$—O—CO—CH=$CH_2$, —$(CH_2)_n$—O—CO—C($CH_3$)=$CH_2$ with n=1 to 8, oxiranyl or thiiranyl.

4. A polymer as claimed in claim 1, which is composed only of repeating units of the formula (II).

5. A polymer as claimed in claim 1, which, in addition to the repeating units of the formula (II), also has a content of other repeating comonomer units.

6. Optical components in communications technology comprising the non-linear optical polymers as defined in claim 1.

7. The polymer of claim 1 wherein the isocyanate functionalities remaining after reaction with the alcohol of formula (I) are further functionalized.

8. The polymer of claim 1 wherein the isocyanate functionalities remaining after reaction with the alcohol of formula (I) have been converted into urethane moieties.

* * * * *

UNITED STATES PATENT AND TRADEMARK OFFICE
CERTIFICATE OF CORRECTION

PATENT NO.: 5,483,005

DATED: January 9, 1996

INVENTOR(S): ETZBACH et al.

It is certified that error appears in the above-identified patent and that said Letters Patent is hereby corrected as shown below:

On the title page;

--[*] Notice: This patent is subject to a terminal disclaimer.--

Signed and Sealed this

Twenty-fourth Day of August, 1999

Attest:

Q. TODD DICKINSON

*Attesting Officer*   *Acting Commissioner of Patents and Trademarks*